Oct. 29, 1963 J. P. STEC ETAL 3,108,338

WEATHER SEALING STRIPS AND MOUNTING MEANS THEREFOR

Filed Jan. 6, 1961 4 Sheets-Sheet 1

INVENTOR
JOSEPH P. STEC
RICHARD E. GERHARDT.
WILLIAM R. LYNCH

BY Justin W. Macklin
ATTORNEY.

Oct. 29, 1963 J. P. STEC ETAL 3,108,338

WEATHER SEALING STRIPS AND MOUNTING MEANS THEREFOR

Filed Jan. 6, 1961 4 Sheets-Sheet 2

INVENTOR
JOSEPH P. STEC
RICHARD E. GERHARDT
WILLIAM R. LYNCH
BY Justin W. Macklin
ATTORNEY INVENTOR.
JOSEPH P. STEC
RICHARD E. GERHARDT
WILLIAM R. LYNCH
BY Justin W. Macklin
ATTORNEY.

Oct. 29, 1963 J. P. STEC ETAL 3,108,338
WEATHER SEALING STRIPS AND MOUNTING MEANS THEREFOR
Filed Jan. 6, 1961 4 Sheets-Sheet 4

INVENTOR.
JOSEPH P. STEC
RICHARD E. GERHARDT
WILLIAM R. LYNCH
BY Justin W. Macklin
ATTORNEY.

3,108,338

WEATHER SEALING STRIPS AND MOUNTING MEANS THEREFOR

Joseph P. Stec, Royal Oak, and Richard E. Gerhardt and William R. Lynch, Birmingham, Mich., assignors to Republic Industrial Corporation, Newark, N.J., a corporation of Delaware Filed Jan. 6, 1961, Ser. No. 81,120
9 Claims. (Cl. 20—69)

This invention is concerned with a novel, flexible, resilient channel section device for carrying thereon windlace, weatherstrip, seals, trim, and the like, and for supporting the same from a flange or the like. The objects of the present invention include the provision of a unit assembly of specially shaped, novel resilient sealing trim or weather strips, combined with our new and particularly adapted carrying and securing means.

Flexible channel section carriers of the general type to which the present invention is related are commonly employed in attaching trim or weatherstrip to the doors or door frames of automobiles, and the accomplishment of this function in an improved manner is an important object of the present invention.

In the installation of automobile doors there are essentially two problems: sealing the door against leakage, and providing a decorative trim to hide minor misalignments between door and door frame. For many years these functions were performed by two separate pieces—a seal, usually rubber, surrounding the door frame and connected thereto by adhesives, and a windcord. The door closes on the rubber seal which functions to prevent leakage, while the windcord, visible from within the car, functions to hide the closure spaces between door and frame.

It has been a common practice to provide a metal flange around the door frame and to support a combination seal and decorative trim from that flange. To accomplish this end, U-section clips having tangs or teeth to bite into the flange were developed, and these clips were disposed at spaced points along the seal or trim and caused to straddle the door frame flange in order to support the seal or trim in position. Continuous flexible channel section is also known for this purpose; again barbs or tangs being provided to keep the section firmly in position straddling the flange.

So long as the flange around the door is of substantially uniform thickness, the devices of the prior art work quite well, but attempts to adapt them to flanges of varying width have been fraught with difficulty due to such factors as the variable opening of the channel section changing the angle of attack of the barbs, and, if the thickness of the flange is great enough, the channel may be required to open up so much that the elastic limit of the material is exceeded, with resulting loss of gripping strength.

It is an object of the present invention to overcome the foregoing disadvantages and to provide a flexible, resilient channel member which is capable of reliably carrying and supporting both decorative and sealing trim while adapting to flanges of widely varying thickness.

A further object of this invention is to provide a strong, reliable channel section free of barbs and consequently free of concern about their angle of attack, and yet capable of strongly gripping a flange even in regions of varying flange thickness.

According to the present invention, a channel section is provided in which the capacity for elastic deformation greatly exceeds the range heretofore known to the art, whereby reliable resilient gripping of thicker flanges is possible.

Important objectives attained by the present invention are the provision of novel and effective sealing strips combined with securing means and which may be conveniently applied to a flange in its permanently mounted position, and which may be durable and economically manufactured.

Other objects and advantages of this invention will be apparent upon consideration of the following detailed description of preferred embodiments of the invention in conjunction with the annexed drawings, wherein.

Figure 1:
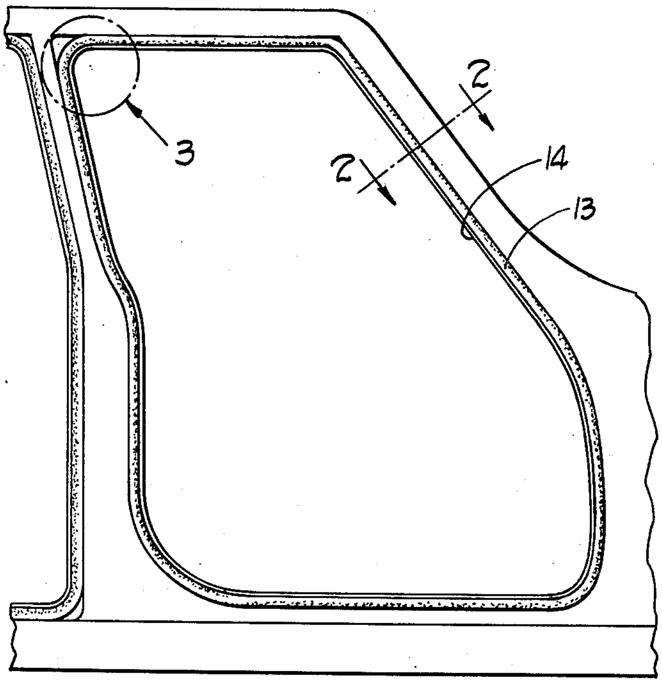
FIG. 1 is a view in side elevation of an automobile door frame equipped with a combination trim and seal constructed in accordance with the teachings of the present invention.
Figure 2:
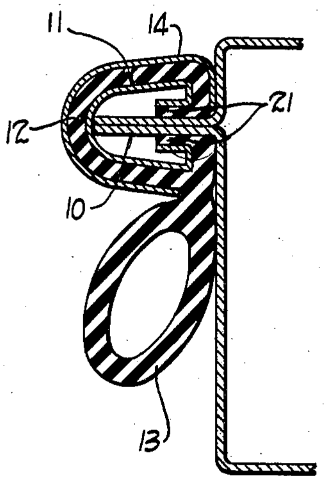
FIG. 2 is a view in cross section to an enlarged scale taken on the line 2—2 of FIG. 1.
Figure 3:
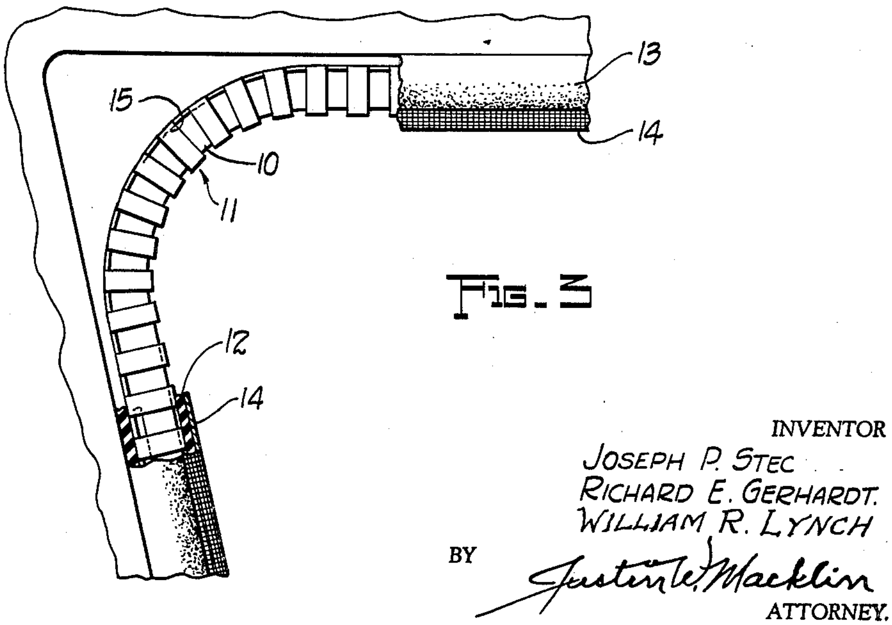
FIG. 3 is a view in elevation to an enlarged scale illustrating the region encircled at 3 in FIG. 1, portions of the covering of the carrier channel section being removed for convenience of illustration to show how it accommodates itself to flange curvature.

Referring now in detail to FIGS. 1, 2 and 3, one form of our invention is there depicted as applied to the sealing and decorative functions required in mounting an automobile door. The door frame of the automobile is provided with a flange which may extend for the entire periphery of the door aperture. This flange shows in FIGS. 2 and 3 and is there designated by reference numeral 10. In FIG. 2 the flange is shown as composed of two laminae, but, actually, in a typical automobile construction, the flange may be in some areas two thicknesses of material and in other areas one or even three or more thicknesses.

Straddling the flange 10 there is a continuous length of resilient, flexible channel section material 11 constructed in accordance with the principles of our present invention. As there shown, this channel is enveloped by a resilient flexible material, such as rubber or plastic, which covers the outer portion of the channel and extends into the mouth of the channel to gripping relation with the flange 10. As shown in FIG. 2, the rubber or plastic has an integral sealing portion 13, projecting toward the outside of the car, and a decorative trim 14 which covers the rubber or plastic 12, at least for the portions facing the inside of the car, and in this illustrated form extending over the entire flange area.

Figure 5:
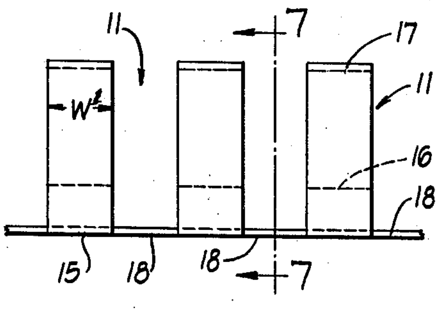
FIG. 5 is a view in side elevation of a short length of carrier channel section constructed in accordance with the teachings of the present invention.
Figures 6, 7:
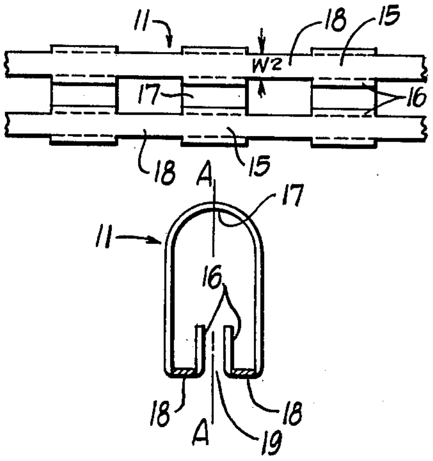
FIG. 6 is a bottom plan view of the carrier channel section of FIG. 5.
FIG. 7 is a view in cross section thereof taken along the line 7—7 of FIG. 5.

Referring particularly to FIGS. 5, 6, and 7, the resilient channel carrier member is shown as consisting of a large number of U-section portions, each having its ends extending inwardly at 15 and upwardly at 16 toward the bight or arch 17 of the U-section portion. The U-sections are integrally mutually interconnected by ribbons 18, which, in effect, form aligned extensions of the portions 15.

Figure 4:
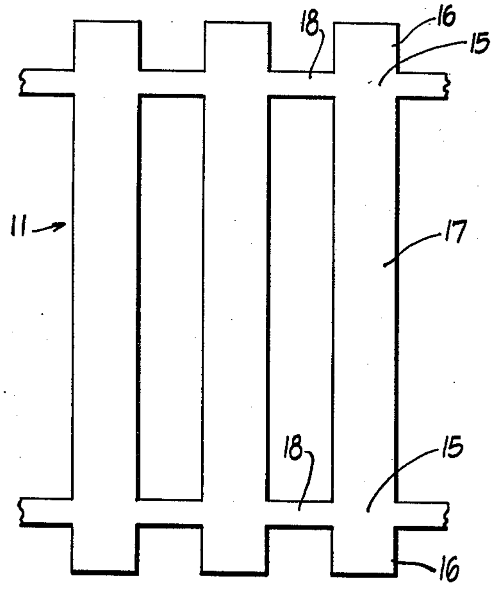
FIG. 4 is a fragmentary plan view of the blank from which the carrier section of the present invention is formed.

The channel section 11 is made from a blank which is cut out, as shown in FIG. 4, the various parts being designated in that figure by the same numbers which are used to designate those parts after they have been bent to the intended configuration. An important feature of the present invention is that the channel section 11 has metallurgical properties such that it can be opened, at its mouth at 19, to about three times the repose position depicted in FIG. 7, without exceeding the elastic limit of the material of the U-section portions. This permits the channel section to accommodate itself to flanges of varying thicknesses while maintaining a firm grip.

As shown in FIG. 2, the entire metal channel section is enveloped in rubber or plastic covering, and the plastic has marginal gripping portions turned upwardly into the spaces between the flat clamping portions 16 of the metal channel and the surfaces of the flange 10. The covering material 14 is shown as extending over the arch and under one inturned side, and it is understood of course that this covering firmly adheres to the outer surface of the rubber or plastic 12.

In a preferred form the transverse members 17 and their clamping end portions 16 are each bent in a U-formation, the flat bottoms of which align with and are integral with the connecting strips 18, whereby the strips 18 and connection portions 15 form continuous narrow ribbons from end to end of the channel section. It will be noted, the channel section exerts its grip on the flange 10 through layers of rubber or plastic which are designated at 21 in FIG. 2.

While in FIG. 7 the upwardly extending members 16 are shown as spaced and generally parallel in the repose condition of the channel section carrier, it is within the scope of this invention for the repose position to lie anywhere from the position illustrated in FIG. 7 to a tightly closed position with the members 16 mutually engaged under spring bias conditions.

Figure 8:
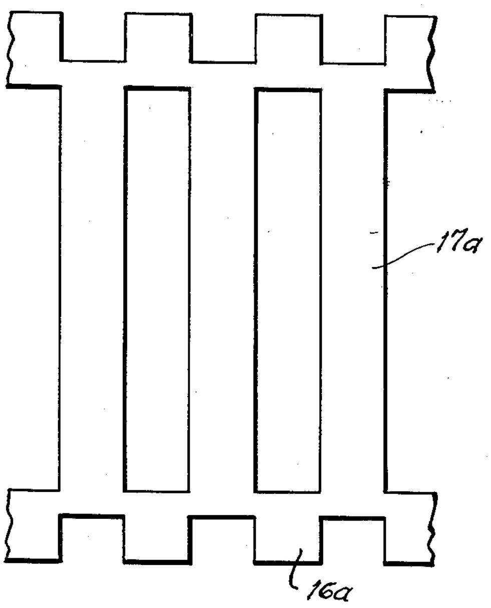
FIG. 8 is a plan view of a blank for a slightly modified form of channel section carrier according to the present invention.

The extensions 16 are shown (in FIGS. 4–7) as being between the same transverse planes as the edges of the U-section members 11, but they may, if desired, be spaced away or offset from alignment with U-forming strips 17a (see FIG. 8). Thus, in the finished channel, the parts forming the upward portion 16a lie between adjacent U-members rather than in alignment with them. Otherwise, the blank of FIG. 8 will produce a carrier the same as that produced from FIG. 4.

It is important to realize that the holding strength of the carrier of the present invention is not only related to the capacity of the members 17 to store energy in resilient deformation, but also to the area of the friction surface presented to the flange. An important feature of the present invention is that the inwardly extending ribbon portions 15 and 18, the upwardly extending portions 16, and the rubber layers at 21 (see FIG. 2), together function as gripping means under the bias of the U-members, which means presents mutually parallel friction faces to the supporting flange when the U-section is in repose and during a considerable range of expansion of the same.

The channel section accommodates itself to curvature of the flange by the flexibility of the portions 15 between the U-section portions. Note in FIG. 3 how these may be bent in a sharp curve. The effect of this bending is to reduce the spaces between the arch portions of the U-sections.

The width of the connecting part of portion 15 in the illustrated form of the invention is substantially less than the width of a U-section member. In FIG. 5 the width of a U-section portion is designated as W′, and in FIG. 6 the width of the connecting ribbon portions 18 is designated as $W^2$. It is, of course, within the scope of the present invention for dimension W′ to be equal or smaller than dimension $W^2$. In any case, it is an advantage for the narrow dimension of each ribbon, consisting of the flat inwardly turned portion 15 and the connection 18, to lie in a plane at right angles to the axis of symmetry A—A of the U-section (see FIG. 7). The width of W′ is such that the loading which occurs when the mouth 19 is opened beyond the repose position is ample to maintain a firm and permanent grip on the flange 10.

Obviously, the proporitons of the width of the U-members 17, indicated by the dimension W′ (FIG. 5), and the spacing between these U-loops may be varied. As was noted in connection with FIG. 3, the finished assembly may be required to fit into short radius corners, and the shorter such a radius is, the more closely will the inner parts of the U-loops be spaced. In practice, the ratios and dimensions, approximately as illustrated, are capable of bridging across and thus concealing an actual angle corner between meeting flanges where the two flanges may have their straight edges meeting at an angle. The relations, spacing and dimensions are such that its supported encasing covering may be bent upon a sufficiently short radius that the sealing portions may be brought into contact with the surfaces of the metal of straight edge meeting-flanges at a corner, leaving no unsealed portions at such a corner.

Figure 9:
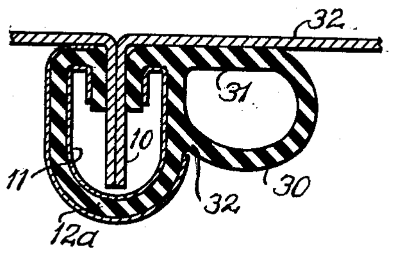
FIG. 9 is a section similar to that of FIG. 2 showing a modified form of the tubular longitudinally extending sealing tube.
Figure 10:
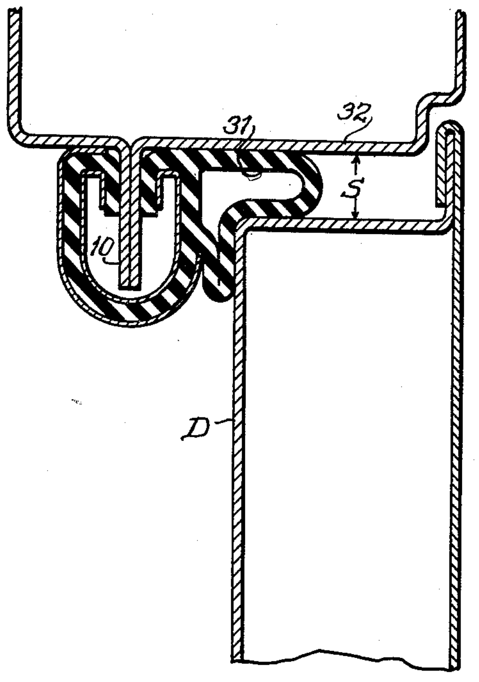
FIG. 10 is a sectional view of the same, showing the relative position of the door and mounting frame when this sealing tube portion is partially compressed into sealing position.

In FIGS. 9 and 10, we have illustrated a somewhat different form of the tubular sealing portion of the rubber. That is, instead of the tubular portion being oval in cross section and being connected by a narrow neck or flange to the rubber embracing the securing channel and having the integral gripped anchored margins between the tabs 16 and the two flange surfaces, as shown in FIG. 2, a different shape has been found in some instances to be more effective in sealing between the door and door post. This different shape of sealing portion is shown at 30 in FIG. 9 as having a portion 31 lying flat along the metal wall 32 of the door post, while the other portion of the tube 30 is integrally joined at 32 with the rubber 12a, surrounding the carrying channel 11.

In effect, the rubber surrounding the carrying channel and that forming the sealing loop have a common wall for a short distance and have been for convenience referred to as a "siamese" formation.

Referring particularly to FIG. 10, a door D may frequently leave a considerable space when closed, as indicated by the dimension S, or may come quite close, making this distance or space smaller. The configuration of the hollow seal, indicated in FIG. 9, is adaptable to the shorter or greater space, and the form of tube seal shown in FIG. 9 assumes a somewhat compressed sealing position, such as indicated in FIG. 10, when the door is closed. It will be apparent that the seal will be effective even though the spacing between the door and post varies considerably.

Figure 11:
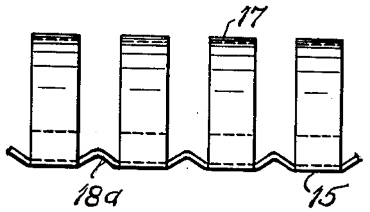
FIGS. 11 and 12 are a side elevation and bottom plan of a slightly modified form of the carrier channel section—these views corresponding to those of FIGS. 5 and 6.
Figure 12:
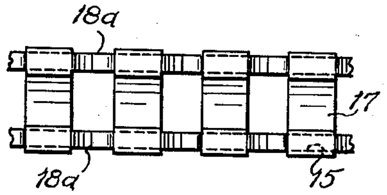

In FIGS. 11 and 12 is illustrated a modification of the carrying channel structure which may be formed from the same kind of blanks as illustrated in FIG. 4, and spaced as illustrated in FIGS. 5–7. In addition, however, the interconnecting ribbon portions 18a, instead of forming flat aligned continuations of the flat portions 15, are bent somewhat to permit relative longitudinal extension or contraction between the adjacent U-loops 17 and the adjacent flat parts 15. As shown, these portions 18*a* are bent upwardly between the connecting surfaces 15—preferably with a rather sharp angle at the mid-portion of the bridge thus formed by each ribbon connection.

The clamping carrier thus formed, when in the finished assembly, may be bent laterally of its longitudinal extent, the bent bridge portions 18*a* thus flattening or bending upwardly slightly to accommodate such positioning. This necessity for offsetting the medial plane (referred to as A—A in connection with FIG. 7) of the finished assembled sealing strip and mounting means, may occur when there may be an offset in the longitudinal alignment of the flange on which the assembly is to be mounted. Usually such offset is only slight—one-eighth of an inch more or less in a distance of, say, one to three inches lengthwise of the assembly, but obviously such lateral offsetting would be transversely of the planes of the ribbon connections 15 and 18, tending to shorten the ribbon at one side and lengthen it at the other. While this relative adjustment need only be a slight amount, it may be more easily effected with the treatment of the ribbon connections shown in FIGS. 11 and 12.

Figure 13:
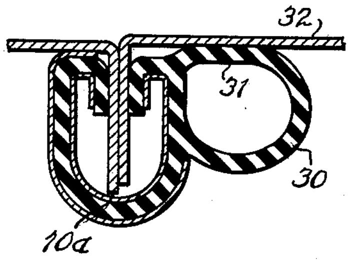
FIG. 13 is a sectional illustration of the position of the carrier and the trim and seal mounted on a pair of contiguous flanges which are offset so that one flange portion projects slightly beyond the other one.

Another irregularity encountered in the flanges is that where the two flanges, shown in FIGS. 2, 9 and 10, are not registered accurately for their mutual width alignment, leaving one projecting outwardly somewhat from another as at 10*a* in FIG. 13. This figure illustrates the seal form of FIG. 9, and as there appears, the completed assembly and seal will not be disturbed unless this offset or defect is considerably greater than usually encountered.

In FIG. 13 the tube 30 is shown as assuming a position where the portion 31 will normally contact the door post metal 32 by reason of its own resiliency and will obviously effect a seal, as illustrated in FIG. 10, when the door is closed.

As a point of further economy, we have provided a sealing means adaptable for use with the carrier channel described, by which a saving of the quantity of expensive rubber or resilient composition is effected.

Figure 14:
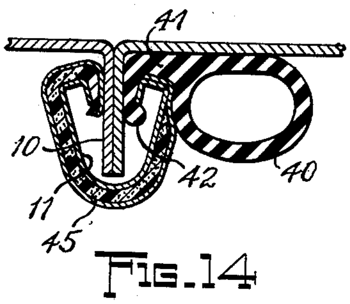
FIG. 14 is another sectional view showing a form of the sealing portion secured by a carrier channel means, in which that portion of rubber seal, shown in previous views as being within the carrier channels, is omitted, except for a single securing flange.

As indicated, the securing and carrying channel construction 11, the same or similar to that previously described, may be used to embrace the flange 10, as before, and a tubular wall of a shape comparable to either of those previously described, designated 40 in FIG. 14, is constructed with a lateral flange or neck portion 41 shaped to extend beneath one of the connecting ribbon portions of the carrier channel and upwardly along the surface of the flange, terminating above the clamping extensions 16 of the channel, as indicated at 42. Thus, we have formed a tubular longitudinal bulb integral with a locking or securing flange portion extending across one flat part 18 of the carrier and upwardly along the clamping fingers 16 at one side only of the carrier. We may thus omit the encasing portion of the rubber embracing and extending clear around the carrier and upwardly under its opposite flange fingers 16. Although the clamping effect on the rubber is only at one side of the carrier and flange, it may be satisfactorily effected. In this case a less expensive covering material, such as a cloth with a backing or filler, indicated at 45, may enclose the carrier channel, needing only to be sufficiently heavy to give a satisfactory appearance and "feel." The cloth with backing should be selected with the purpose of preventing a puckering or wrinkling effect as the carrier is formed to fit into a square corner or short radius. The cloth material is substantially less expensive, and thus a saving over the cost of rubber is effected, and the assembly may be somewhat simplified. There is also a saving of the use of cement as well as rubber.

Still another modification of our invention may effect a further saving. The formation of rubber into tubular longitudinal bulbs and substantially tubular carrier embracing portions, such as in the forms shown in FIGS. 2 and 9, is accomplished only by relatively expensive extrusion and with the use of comparatively expensive rubber composition. We have found that a further saving may be effected while still providing a satisfactory seal and effective mounting therefor by the use of a shape which is suited to the more economical method of formation, commonly known as molding, as distinguished from extrusion.

Figure 15:
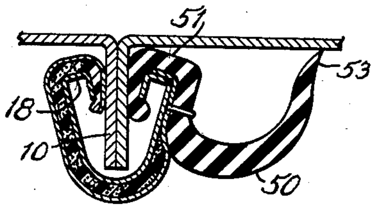
FIG. 15 is a similar view of a modified form of the resilient sealing strip shown as secured in the same manner as that of FIG. 14.
Figure 16:
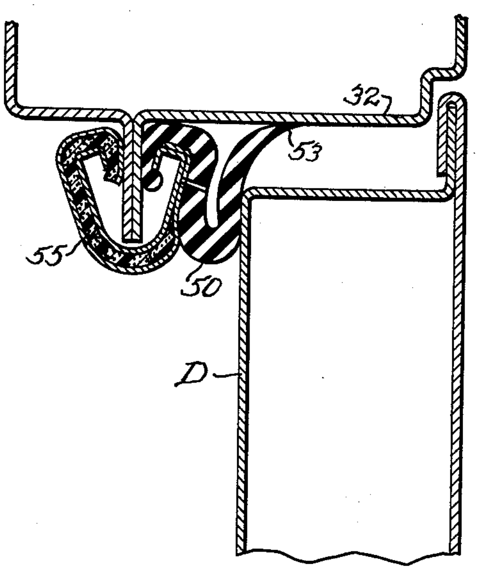
FIG. 16 is a view similar to FIG. 10 showing the position of the sealing strip of FIG. 15 when the door is closed.

With these objectives in mind, we have devised a wing or leaf type of sealing strip, a preferred form of which is shown in FIGS. 15 and 16. Here is illustrated a seal portion 50 of concavo-convex formation which has a portion 51 extending beneath one of the continuous flat portions 18 of the carrier channel, and upwardly between the clamping fingers 16 and the flange 10, terminating slightly beyond the ends of these clamping fingers. This shape may be molded in suitable lengths in dies so that the strips before attachment are approximately the shape shown in FIG. 15, which we may refer to as a cantilever leaf tapering from a thickened intermediate arch to an edge at 53 and having an integral flange forming substantially a right angle, and shaped to embrace the carrier at one side, both inside and outside of the parts of the carrier joining with the strips 18. As indicated, this shape of leaf seal may be made of lower cost raw materials than are required for the extruded types. A preferred material is known as "open seal sponge."

In actual experience we have found that a savings as compared to the extruded type rubber longitudinal bulb seals may be as much as fifty percent lower cost. A part of the material saving is due to an economy in the process which permits using a very thin neoprene coating required for oxidation resistance, as compared to a much higher percentage of neoprene required for solution in extruded hollow type closed seals.

The seal in use, for example, mounted on the flange of a door post, may assume the shape in folded compression, indicated in FIG. 16 when the door D is closed. Obviously the contact with the surfaces to be sealed will be tight and secure. Here, as described in connection with FIG. 14, the securing and carrying channel may be covered with a cloth and a suitable filler material, indicated at 55, may assure smooth continuity of the surface of the cloth.

It will be seen that the carrying and securing channel is so constructed that with any of the forms of seals described any raw edges or knife edges or points are avoided. The upturned clamping finger portions 16 are flat, and the securing is by frictional compression which is sufficient and securely holds the trim and seal assembly in place.

Further, it will be seen that our carrying device and its combination with the seals when assembled is adaptable to varying sizes and thicknesses of flanges.

It will be noted that slight variations may be made. For example, the inturned portions constituting the continuous ribbon strips may be positioned at different heights from the crown of the U-loops, while still being in parallel and clamping relation normal to flange surfaces.

Our novel form of carrying channel, when assembled with the sealing strips, readily lends itself to using spreading and pressing wings of an applicator or applying tool, which may ride within the flanges between the fingers 16. Thus, a movement of such a tool may effect both spacing and positioning, as well as pressing into position.

It will also be noted that even though the connecting ribbon portions are normally in substantially the same plane, they may be tipped somewhat from that plane when the assembly is embracing the flange of greater than normal overall thickness, but the resiliency of the material being clamped and the spring action of the metal may still accomplish a satisfactory grip on the flange.

It will be seen that we have, for the purposes indicated, provided a novel, yet simple, economically manufactured carrier and combined sealing means which for its purposes is adaptable to varying conditions; is thoroughly practical and neat in appearance, as well as being capable of being readily applied, and which experience has proven to be very durable in use and not likely to become displaced.

What is claimed is:

1. A flexible metal flange-embracing seal-carrying channel comprising a plurality of spaced apart U-section portions normally in parallel positions transversely of the channel, each U-section portion having its two ends bent to extend inwardly toward one another and then upwardly toward the bite of the U-section portion to form flat gripping surfaces normally in mutually parallel relationship, and intergal and flexible longitudinally extending flat ribbon portions mutually interconnecting said inwardly turned portions and forming therewith at each side of the channel an uninterrupted connecting member constituting a continuous narrow ribbon from end to end of the channel section joined with adjacent ends of each of the U-section portions and positioned at right angles to the flange.

2. The flexible metal flange-embracing channel defined in claim 1 which when covered with enveloping material extending around the exterior and inwardly across the ribbon portions and upwardly into the interior may be gripped at its upwardly extending edges by flat inturned ends pressing toward an anchoring flange between said continuous ribbons.

3. The flexible metal seal-carrying channel defined in claim 1 in which the upwardly turned gripping portions are normally spaced apart forming a mouth, and in which the resiliency of the U-section members is such that the mouth may be opened an amount approximately three times its width in repose without exceeding the elastic limit of the metal.

4. A flexible metal seal-carrying channel adapted to straddle and engage a flange and comprising a pair of narrow flat flexible ribbons extending from end to end of the channel, bridging transverse longitudinally spaced narrow U-shaped section members integrally connected with and bridging said ribbons at spaced intervals therealong, said ribbons being so positioned that when viewed in section they extend inwardly toward one another from the free ends of the U-shaped members, and integral flat gripping surface portions extending upwardly from the inner edges of said ribbons.

5. The flexible metal channel defined in claim 4 in which said gripping portions are offset from the transverse planes of said U-shaped bridging members.

6. A flexible metal seal-carrying channel adapted to straddle and engage a flange comprising a pair of long narrow ribbons and integral U-section members bridging said ribbons at spaced intervals therealong with the ribbons as viewed in section extending inwardly toward one another at right angles to the flange and from the free ends of the shanks of the U-section members, said ribbons each constituting a continuous member comprising flexible bridging portions between the U-section members and longitudinally aligned substantially flat inturned portions of the U-section members integral with the inner edges of said ribbons.

7. The combination of a resilient sealing strip and mounting means therefor adapted to straddle and embrace a rigid carrying flange, said mounting means comprising a flexible metal carrier channel having mutually spaced U-section portions and having flange gripping means extending inwardly adjacent the ends of the U-portions and at right angles to the flange and then toward the arch of the U-sections, and integral flexible ribbons mutually interconnecting said portions lengthwise of the channel and normally positioned to be pressed edgewise toward the flange surfaces, the sealing strip comprising a longitudinally extending resilient member having a seal portion positioned laterally of the carrier channel, and having a flange portion extending along one of said ribbon portions and then inwardly toward the inside of the U-portions, whereby resilient action of the U-portions may press the intervening resilient flange portion tightly against a surface of said rigid flange, said flexible ribbons and the connected inwardly turned portions forming an aligned continuous strip of substantially uniform width.

8. The sealing structure and mounting means defined in claim 7, in which the carrier channel has flat gripping extensions integral with the inner edges of said ribbons and turned inwardly toward the arch of the U-sections and positioned to press toward the intervening rigid carrying flange.

9. A flexible metal channel for securing a sealing strip to a flange, said channel comprising a plurality of mutually spaced U-section portions having flange gripping means extending inwardly adjacent their ends, and longitudinally extending narrow ribbons mutually integrally interconnecting aligned inturned portions of said U-sections lengthwise of said carrier channel and bridging between aligned inwardly extending portions at each end of each U-section, each of said bridging portions of said ribbons being bent from normal alignment to facilitate longitudinal extension or contraction between the U-sections.

References Cited in the file of this patent

UNITED STATES PATENTS

| | | |
|---|---|---|
| 2,602,202 | Orr | July 8, 1952 |
| 2,699,581 | Schlegel | Jan. 18, 1955 |
| 2,724,877 | Ramsey | Nov. 29, 1955 |
| 2,942,309 | Renaudin | June 28, 1960 |
| 2,974,383 | Bright | Mar. 14, 1961 |

FOREIGN PATENTS

| | | |
|---|---|---|
| 503,355 | Great Britain | Apr. 5, 1939 |
| 723,499 | Great Britain | Feb. 9, 1955 |